United States Patent [19]

Hung

[11] Patent Number: 5,064,249

[45] Date of Patent: Nov. 12, 1991

[54] DISC WHEEL COVER

[76] Inventor: Chun-Mao Hung, P.O. Box 1032, Tainan, Taiwan

[21] Appl. No.: 506,229

[22] Filed: Apr. 9, 1990

[51] Int. Cl.$^5$ ................................................. B60B 7/12
[52] U.S. Cl. .................................... 301/37 P; 301/37 R
[58] Field of Search ............. 301/37 R, 37 P, 108 R, 301/108 A, 37 PB, 37 TP; 403/3, 4, 305; 24/20 EE

[56] References Cited

U.S. PATENT DOCUMENTS

| 3,184,535 | 5/1965 | Worthington | 403/305 X |
|---|---|---|---|
| 3,480,329 | 11/1969 | Foster et al. | 301/37 R X |
| 4,266,831 | 5/1981 | Foster et al. | 301/37 PB X |
| 4,657,296 | 4/1987 | Nishii et al. | 403/4 X |

FOREIGN PATENT DOCUMENTS

| 0300333 | 1/1989 | European Pat. Off. | 301/37 PB |
|---|---|---|---|
| 0170101 | 7/1988 | Japan | 301/37 PB |

Primary Examiner—Russell D. Stormer
Attorney, Agent, or Firm—Bacon & Thomas

[57] ABSTRACT

A disc wheel cover comprising a side ring joiner and a disc wheel side ring having free ends joined by the joiner. The joiner has two pairs of holes having different depths for the ends of the side ring to be selectably inserted and retained therein so that the side ring diameter can be varied to match the wheel despite any small error in the wheel diameter.

1 Claim, 2 Drawing Sheets

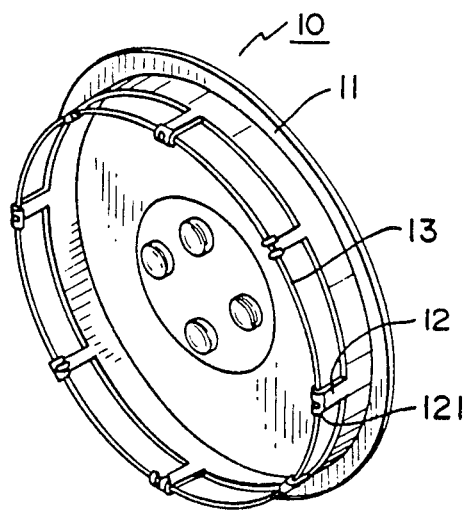
FIG. 1
PRIOR ART
FIG. 2
PRIOR ART
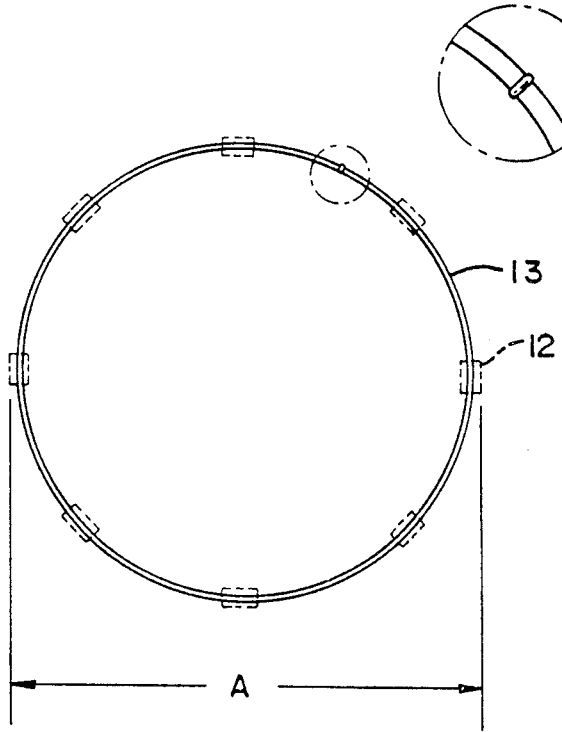
FIG. 2A
PRIOR ART

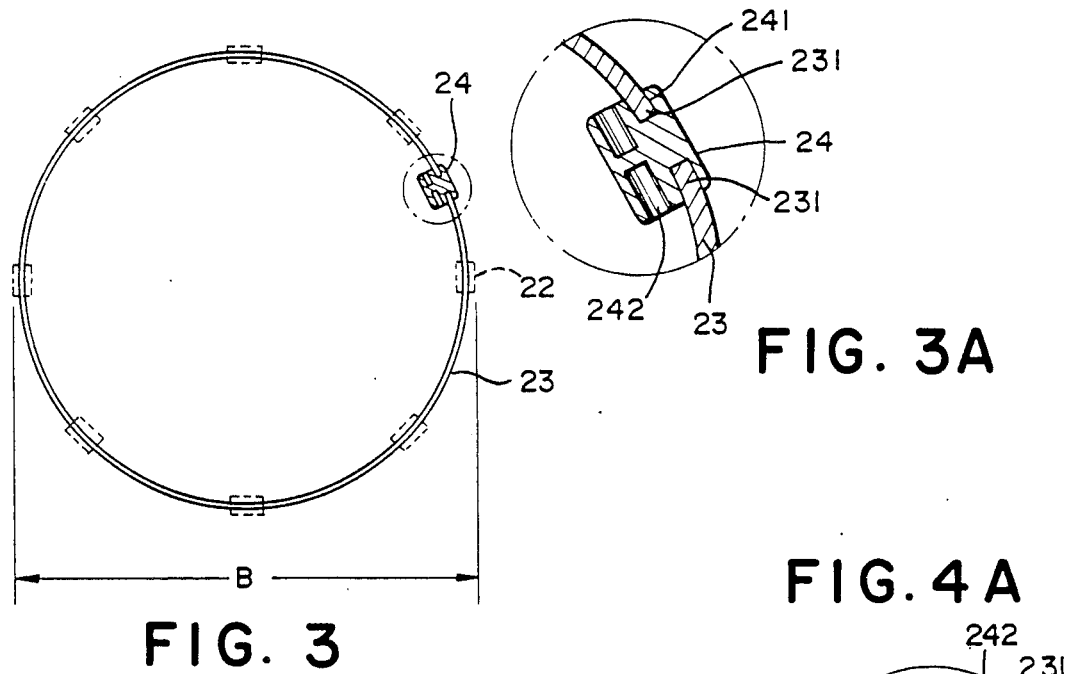
FIG. 3
FIG. 3A
FIG. 4
FIG. 4A
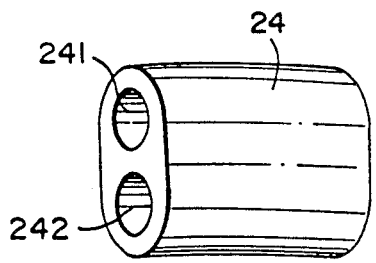
FIG. 5
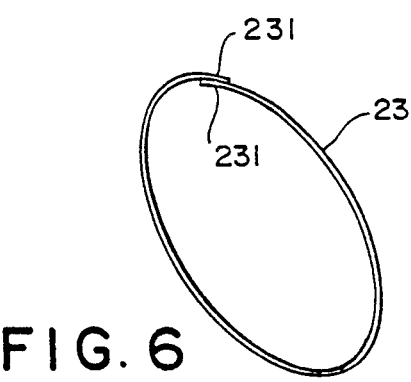
FIG. 6

DISC WHEEL COVER

BACKGROUND OF THE INVENTION

The invention concerns a disc wheel cover in an automobile. A disc wheel cover is used for adornment covering the disc wheel, and a conventional disc wheel cover 10 has the structure shown in FIG. 1, comprising a base plate 11, six or eight hook arms 12 each having a hook 121 for catching and holding a disc wheel side ring 13, which serves for urging outward the hook arms 12 with the tightening force caused by hooks arms 12 when they stick in the inner circumferential edge of a disc wheel.

Said disc wheel side ring 13 has the structure shown in FIG. 2, and is made of a slender round bar having both ends welded together so that it has definite diameter impossible to be varied a bit, thus the functional diameter formed by the outer edges of the hook arms 12 is also difinite or unadjustable, as shown in FIG. 2, after engaging the disc wheel side ring 13 to the hooks 121.

As the disc wheel cover rotates very fast synchroneously together with the wheel, the interconnecting tightness between the hook arms 12 and the inner circumferential edge of the disc wheel is extremely important. If their mutual tightness is not proper, the disc wheel cover may accidentally fall off and wound a person walking on the street during driving of a car.

When the inner circumferential edge of a disc wheel has a diameter a little different from the definite functional diameter that the hook arms 12 define, the disc wheel cover 10 may not be fixed with the disc wheel in a secured condition. Though a disc wheel theoretically has a certain inner diameter, it is inevitable that some error may happen in the manufacturing process. Some disc wheel covers are easily fixed with a disc wheel or even may slightly be loose, and it means that the inner circumferential edge of the disc wheel has a little larger diameter than the functional diameter the disc wheel cover 10 has, and the disc wheel cover is unsuable. On the contrary, if a disc wheel cover 10 is difficult to be fixed to a disc wheel or cannot be fixed thereto without hammer, it means that the inner circumferential edge of the disc wheel has a smaller diameter than the functional diameter the disc wheel cover 10 has. The cause of these two cases originates from the error of the outer diameter the disc wheel has and the definite, unadjustable diameter the disc wheel cover side ring has.

This invention aims to furnish a disc wheel side ring of which the diameter is adjustable between two different measurements so as to cope with the diametrical error a disc wheel may have.

SUMMARY OF THE INVENTION

The disc wheel cover in the present invention comprises a disc wheel side ring made of a slender round bar having both ends free, not welded together and a side ring joiner shaped as a curved rectangle and having two pairs of two lengthwise holes of different depths. The ends of the disc wheel side ring are to be inserted and stay elastically in one of the two pairs of holes in the side ring joiner so that the disc wheel side ring can be selected to have either of the two diametrical measurements after it is joined with the side ring joiner. The diametrical differentiation between the two measurements does not have to be great, but small enough to cope with a small diametrical error a disc wheel may have so that the disc wheel cover can be assembled with the disc wheel under proper tightness without any risk of snapping off.

BRIEF DESCRIPTION OF THE DRAWINGS

FIG. 1 is a perspective view of a conventional disc wheel cover;

FIGS. 2 and 2a show elevational views of a disc side ring used in the conventional disc wheel cover;

FIGS. 3 and 3a show elevational views of a disc wheel side ring and a sectional view of a joiner to be used in a wheel cover according to the present invention wherein two ends of the disc wheel side ring are joined with the joiner to define a greater diametrical dimension of two different measurements;

FIGS. 4 and 4a show similar views to those in FIG. 3 wherein the two ends of the disc wheel side ring are joined with the joiner to define a smaller diametrical dimension of the two different measurements;

FIG. 5 is a perspective view of the joiner; and

FIG. 6 is a perspective view of the disc wheel side ring which is in a state before joining its two ends with the joiner.

DETAILED DESCRIPTION OF THE INVENTION

Referring to FIGS. 3 and 4, the disc wheel side ring 23 in the present invention is made of a slender round bar, having two ends 231 joined together with a joiner 24 shaped as a curved rectangle, having two pairs of lengthwise holes, one pair of shallow holes 241 and another pair of deep holes 242 for two ends 231 of the side ring 23 to selectably insert and stay in either pair 241 or 242 so that the disc wheel side ring 23 defines the functional diameter B when the ends 231 are fully inserted into the pair of holes 241, and the functional diameter C when the ends 231 are fully inserted into the pair of holes 242. The arrangement of these two different diametrical measurements of the disc wheel side ring 23 enables slight radial adjustment among the hook arms 22 to match a disc wheel, which in-evitably has a slight diametrical error, and a proper interconnecting tightness, not too tight or loose, between the hook arms 22 and the disc wheel can be achieved.

In general, the diametrical error of a disc wheel is very small. It must be emphasized that said small diametrical error may cause in-secure interconnection between the disc wheel and the disc wheel cover. To settle the above, only a small differentiation in depth between the two pairs of holes 241, 242 is necessary for the achievement of a safe, smooth installation of the wheel cover to a disc wheel. When the pair of shallow holes 241 is used, the unused pair of deep holes 242 locates naturally in the inner side of the disc wheel side ring, as best shown in FIG. 3, and when the pair of deep holes 242 is used, the joiner 24 can be forcefully turned 180 degrees about the free ends 231 of the disc wheel side ring 23 so as to locate the outer portion of the joiner 24 containing the pair of shallow holes 241 from outer side of the disc wheel side ring 23 into the inner side thereof, as best shown in FIG. 4, so as not to affect the function of the disc wheel cover.

Now, referring to FIG. 6, the disc wheel side ring 23 is preferably to be made to overlap a little both ends to have a bit smaller diameter than that of the diameter practically used so that the disc wheel side ring 23 can firmly be joined with its free ends inserted and kept in the joiners 24 constricted by its elasticity, and thereby the joiner 24 may not separated from the said side ring 23.

What is claimed is:

1. A disc wheel cover comprising a side ring joiner shaped as a curved rectangle and having two pairs of lengthwise holes of different depths and a disc wheel side ring made of a slender round bar and having free ends joined together by inserting selectably in either of the two pairs of lengthwise holes provided in the side ring joiner so that the disc wheel side ring diameter can be varied to match the wheel despite any small error in the wheel diameter.

* * * * *